A. HUELSMAN.
WEIGHING SCALE.
APPLICATION FILED JUNE 17, 1913.
1,187,323.
Patented June 13, 1916.
3 SHEETS—SHEET 1.
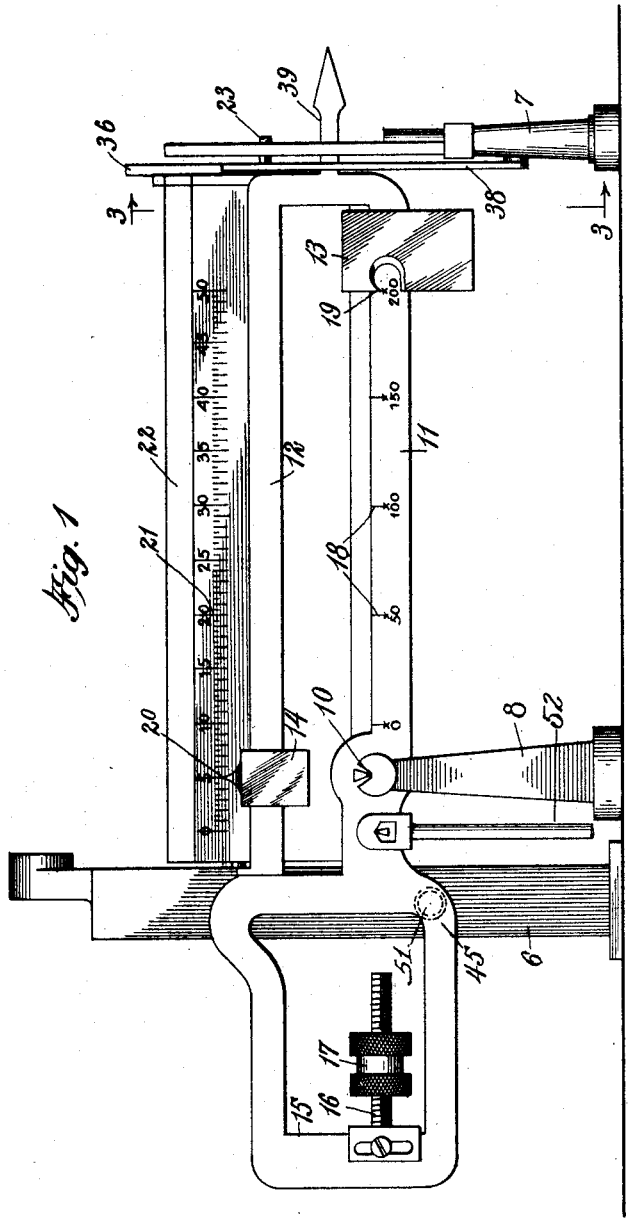
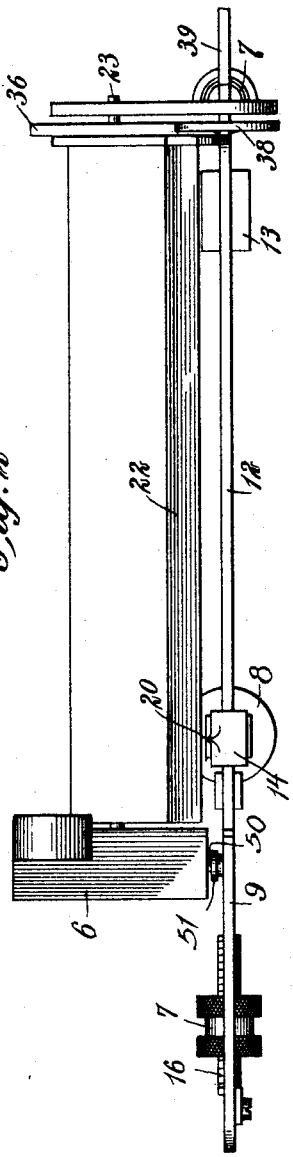
WITNESSES
F. D. Swart
E. B. Marshall
INVENTOR
Albert Huelsman
BY Munn & Co
ATTORNEYS A. HUELSMAN.
WEIGHING SCALE.
APPLICATION FILED JUNE 17, 1913.
1,187,323.
Patented June 13, 1916.
3 SHEETS—SHEET 2.
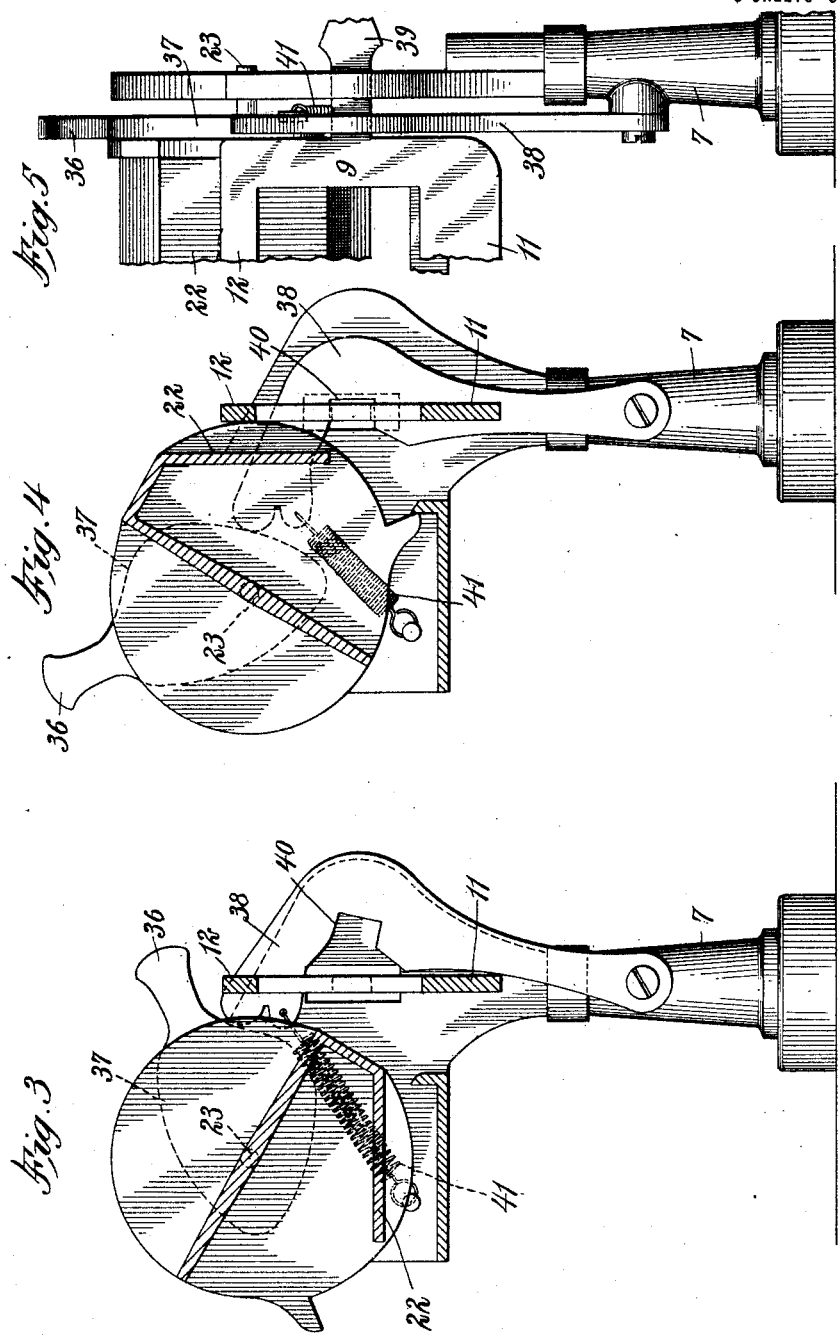
WITNESSES
F. D. Swett
E. B. Marshall
INVENTOR
Albert Huelsman
BY
ATTORNEYS A. HUELSMAN.
WEIGHING SCALE.
APPLICATION FILED JUNE 17, 1913.
1,187,323.
Patented June 13, 1916.
3 SHEETS—SHEET 3.
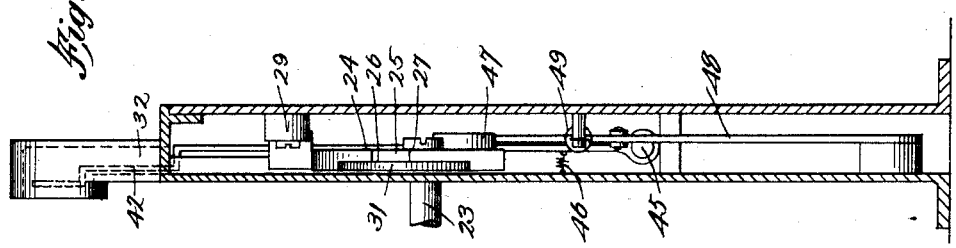
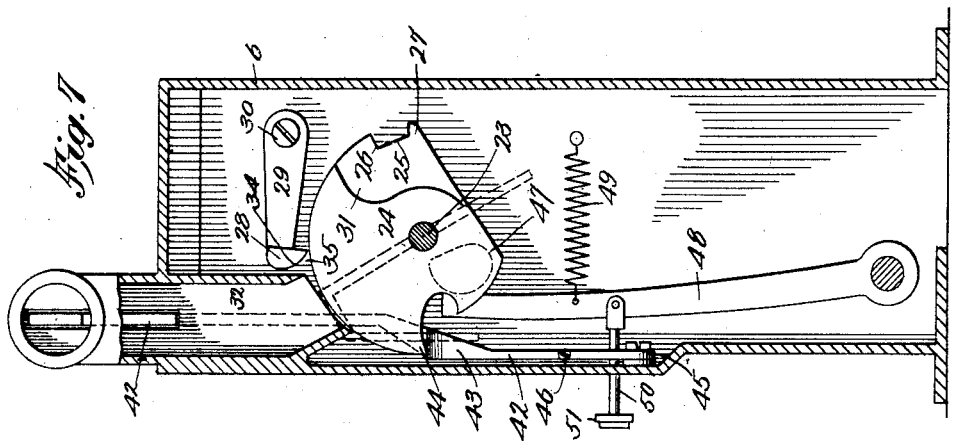
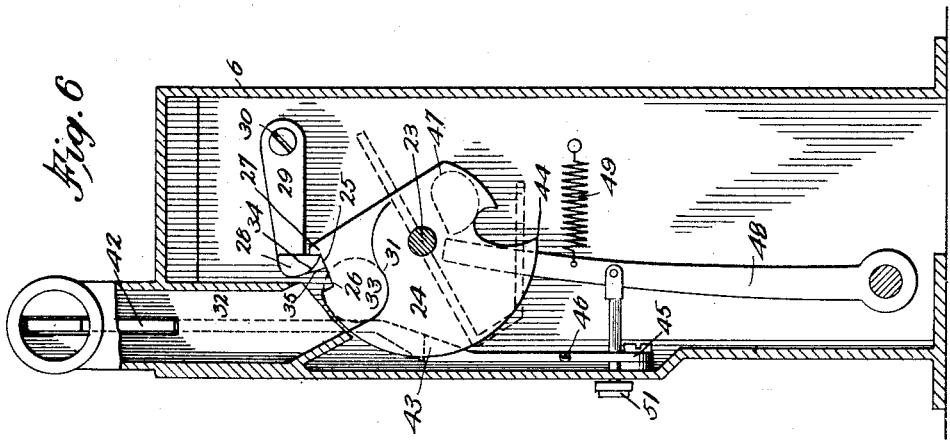
WITNESSES
F. D. Swift
E. B. Marshall
INVENTOR
Albert Huelsman
BY Munn & Co
ATTORNEYS

UNITED STATES PATENT OFFICE.

ALBERT HUELSMAN, OF FOND DU LAC, WISCONSIN.

WEIGHING-SCALE.

1,187,323.  Specification of Letters Patent.  Patented June 13, 1916.

Application filed June 17, 1913. Serial No. 774,116.

*To all whom it may concern:*

Be it known that I, ALBERT HUELSMAN, a citizen of the United States, and a resident of Fond du Lac, in the county of Fond du Lac and State of Wisconsin, have invented a new and Improved Weighing-Scales, of which the following is a full, clear, and exact description.

The object of my invention is to provide a weighing scales having a shaft with a scale secured for rotating therewith, there being at one end of the shaft coin-controlled mechanism for releasing the shaft. Disposed substantially parallel with the scale there is a lever having a sliding weight for coöperating with the scale when the scale and the shaft have been rotated, to operative position, after a coin has been introduced in the slot of the coin-controlled mechanism. The lever is locked when the device is not in use, and means are provided for freeing the lever for use when the shaft is rotated. The scale on the shaft is exposed at the front of the weighing scales when the shaft is in inoperative position, and when the shaft is rotated to operative position the scale on the shaft is moved out of view, so that it is necessary to rotate the shaft to inoperative position, in order to move the scale to ascertain the weight by comparison of the sliding weight with the scale on the shaft.

Additional objects of the invention will appear in the following complete specification, in which the preferred form of the invention is disclosed.

In the drawings similar characters of reference indicate corresponding parts in all the views, in which—

Figure 1 is a front elevation of the invention; Fig. 2 is a plan view of Fig. 1; Fig. 3 is an enlarged sectional view on the line 3—3 of Fig. 1; Fig. 4 is a sectional view similar to that shown in Fig. 3, but with the shaft rotated to inoperative position to exhibit the scale carried thereby; Fig. 5 is a side elevation of Fig. 4; Fig. 6 is a sectional view showing the coin-controlled mechanism in locked position; Fig. 7 is a sectional view similar to that shown in Fig. 6, but with the shaft rotated to lock the lever of the weighing scales; Fig. 8 is a sectional side elevation of Fig. 7.

By referring to the drawings it will be seen that a frame is provided, having members 6, 7 and 8, a weighing lever 9 being fulcrumed at 10 on the member 8. This lever 9 has two sections 11 and 12, a sliding weight 13 being mounted for moving longitudinally on the section 11 of the lever 9, and a sliding weight 14 being mounted for moving longitudinally on the section 12 of the lever 9. At the left of the lever 9 there is an opening 15, in which is disposed a screw 16, with which meshes a nut 17, it being possible to rotate this nut on the screw 16, to adjust the lever 9, as may be desired. On the section 11 of the lever 9 there are figures 18, and the sliding weight 13 has a point 19, which extends in the direction of the figures 18 when the sliding weight 13 is moved along the section 11 of the lever 9. The sliding weight 14 has a point 20, which extends upward, and which points in the direction of the figures 21 on the scale 22, when the sliding weight 14 is moved along the section 12 of the lever 9. This scale 22 is mounted on a shaft 23, journaled in bearings in the frame members 6 and 7, and it will be seen that when the shaft 23 is rotated to the position shown in Fig. 3 of the drawings, the figures 21 on the scale 22 will be rotated under the shaft 23, so that it will be impossible to compare them with the point 20 on the sliding weight 14.

The device shown in Figs. 6, 7 and 8 is a coin-controlled mechanism for locking the shaft 23, this mechanism consisting of a member 24, which is secured to the shaft 23, the member 24 having an opening 25, with shoulders 26 and 27, in which is normally disposed the hook 28, on the latch member 29, pivoted at 30 in the frame member 6. The member 24 also has a coin seat 31, which is disposed under the coin chute 32, and this coin seat 31 is so positioned that when a coin 33 is disposed therein it will extend beyond the shoulder 26, to engage the curved surface 34 on the hook 28 of the latch 29. In this way the coin 33 carried by the member 24, serves to raise the hook 28 in the opening 25 in the member 24, but when a coin is not seated in the seat 31 the straight portion 35 of the hook 28 is engaged by the shoulder 26, which prevents the further rotation of the member 24, and the shaft 23 relatively to the frame member 6.

It will therefore be seen that in order to rotate the shaft it is necessary to insert a coin in the coin chute 32, that it will be disposed in the seat 31 and so that it will engage the curved portion 34 of the hook 28, to permit the member 24, the shaft 23, and the scale 22, to rotate relatively to the other parts. After the coin has been introduced in the chute 32, the shaft 23 may be rotated, by means of the handle 36, which is secured thereto, and to this handle 36 there is also secured a cam 37, for engaging the locking lever 38, for freeing the locking lever from the pointer 39 on the lever 9, this locking lever 38 having a recess 40, in which the said pointer 39 is disposed, when the handle 36 is raised to the position shown in Fig. 4 of the drawings. A spring 41 is provided, for holding the locking lever 38 with the pointer 39 embraced by the locking lever around the opening 40. In this way the raising of the latch 29 by means of the coin 33, not only permits the shaft 23 to rotate, carrying with it the scale 22, but it also permits the spring 41, to move the locking lever 38 forward, and into engagement with the pointer 39, at the right of the lever 9.

When a coin is inserted in the chute 32, it will fall to the coin seat 31 and the weights 13 and 14 having been adjusted, the handle 36 is raised to rotate the shaft 23, the scale 22 and the member 24. A comparison of the weights 13 and 14 and the scale 22 may then be made to determine the weight on the scale. With the rotation of the member 24 the catch 43 on the arm 42 pivoted at 45 engages the point 44 of the member 24 and the scale 22 is held in this position until another coin is inserted in the chute 32. The lever 9 is also held against movement by the engagement of the cam 47 with the arm 48 for moving the arm 48 forwardly against the resiliency of the spring 49, this arm 48 carrying a stud 50 with a head 51 for engaging the lever 9. This is all shown in Fig. 7 of the drawings. The parts now remain in this position until another coin is inserted in the chute 32 when this second coin will press against the pivoted arm 42 for moving the catch 43 carried by the arm 42 out of engagement with the point 44 of the member 24. This arm 42 is pivoted at 45 and is held yieldingly with its catch 43 engaging the point 44 by a spring 46. The member 24, the shaft 23 and the scale 22 are prevented from rotating when the catch 43 engages the point 44. The second coin having been inserted in the chute 32 it presses aside the arm 42 and the catch 43 and permits the member 24, the shaft 23 and the scale 22 to rotate by the weight of the member 24 and the scale 22, the spring 49 and the cam 47 assisting this movement. The member 24 is then locked by the latch member 29, but the member 24 having moved sufficiently far to carry the cam 47 rearward, permits the rearward movement of the stud 50 and its head 51 to free the lever 9. With the movement of the handle 36 the scale may be operated in the manner heretofore described.

Having thus described my invention, I claim as new and desire to secure by Letters Patent:

1. In a weighing scale, a scale member, a scale for rotating from inoperative position to a position adjacent the scale member, coin-controlling mechanism for locking the scale against the movement relatively to the scale member and locking means for the scale member operable by the scale.

2. In a weighing scale, a lever, a shaft, a scale on the shaft, coin-controlled means for preventing the rotation of the shaft in one direction, a locking lever for embracing the first mentioned lever and means actuated by the shaft for moving the locking lever relatively to the lever.

3. In a weighing scale, a frame, a shaft journaled in the frame, a member secured for rotating with the shaft, and having a shoulder, a latch for engaging the shoulder for preventing the rotation of the member and the shaft in one direction, there being a coin seat in the member for holding a coin to lift the latch and permit the rotation of the member in the said direction, a scale on the shaft, and a scale member for coöperating with the scale.

4. In a weighing scale, a frame, a shaft journaled in the frame, a member secured for rotating with the shaft, and having a shoulder, a latch for engaging the shoulder for preventing the rotation of the member and the shaft in one direction, there being a coin seat in the member for holding a coin to lift the latch and permit the rotation of the member in the said direction, a scale on the shaft, a lever, a weight movable on the lever, an arm, a stud on the arm for engaging the lever for holding the lever against movement relatively to the frame, and a cam on the member for operating the arm.

5. In a weighing scale, a frame, a shaft journaled in the frame, a member secured for rotating with the shaft, and having a shoulder, a latch for engaging the shoulder for preventing the rotation of the member and the shaft in one direction, there being a coin seat in the member for holding a coin to lift the latch and permit the rotation of the member in the said direction, a scale on the shaft, a lever, a weight movable on the lever, an arm, a stud on the arm for engaging the lever for holding the lever against movement relatively to the frame, a cam on the member for operating the arm, and a spring for holding the arm yieldingly in a predetermined position.

6. In a weighing scale, a frame, a shaft journaled in the frame, a lever, a weight for moving on the lever, a locking arm for engaging the lever and pivoted on an axis disposed substantially parallel with the lever, and a cam on the shaft for operating the locking arm.

7. In a weighing scale, a lever, a frame, a shaft journaled in the frame, a member secured for rotating with the shaft, and having a shoulder, a latch for engaging the shoulder for preventing the rotation of the member and the shaft in one direction, there being a coin seat in the member for holding a coin to lift the latch and permit the rotation of the member in the said direction, a weight movable on the lever, a scale on the shaft, a locking arm for engaging the lever, and means operable by the shaft for moving the locking arm relatively to the lever.

8. In a weighing scale, a lever, a shaft, a member secured for rotating with the shaft and having a shoulder, a latch for engaging the shoulder for preventing the rotation of the member and the shaft in one direction, there being a coin seat in the member for holding a coin to lift the latch and permit the rotation of the member in the said direction, a weight movable on the lever, a scale on the shaft, a locking arm engaging the lever, means operable by the shaft for actuating the locking arm, a corn chute, a catch for engaging the member to prevent its rotation in the other direction, and means in the coin chute for releasing the catch when engaged by a coin.

9. In a weighing-scale having a poising scale-beam, a rotatable rod provided with weight-indications normally under display, a locking-device normally locking said beam, and means connected with said rod for rotating it to turn the indications thereon out of their display-position, and operating to unlock said device to release the beam.

10. In a weighing-scale, a scale-beam comprising a lower member having weight-indications on its display-face and an upper member without such indications, weights on said members, a rod provided with weight-indications and rotatably supported above the upper beam-member, a locking-device normally locking said beam, and means connected with said rod for rotating it to turn the indications thereon out of their display-position, and operating to unlock said device to release the beam.

11. A weighing-scale having a rotatable member provided with weight-indications normally under display, means normally preventing said scale from weighing an object to be weighed, and means connected with said rotatable member for rotating it to turn the indications thereon out of their display-position, and operating to render inoperative the weighing preventing means.

12. In a weighing-scale, a poising scale-beam, a rod rotatably supported apart from said beam and provided with weight-indications, means normally preventing said scale from weighing an object to be weighed, and means operative on the insertion of a coin connected with said rod for rotating it to turn the indications thereon into and out of their display-position and operating to render inoperative the weighing-preventing means.

13. In a weighing-scale, a scale-beam comprising lower and upper members, a rod rotatably supported apart from said beam and provided with weight indications, weights on the beam-members, a locking-device normally preventing poising of said beam to weigh an object on the scale-platform, and means operative on the insertion of a coin connected with said rod for rotating it to turn the indications thereon into and out of their display-position and operating to unlock said device.

14. In a weighing-scale, a scale-beam comprising a lower member having weight-indications on its display face and an upper member without said indications, weights on said members, a rod provided with weight-indications and rotatably supported above the upper beam-member, means normally preventing said scale from weighing an object to be weighed, and means operative on the insertion of a coin connected with said rod for rotating it to turn the indications thereon into and out of their display-position and operating to render inoperative the weighing-preventing means.

15. In a weighing scale, a scale beam, a rotatable rod provided with weight indications, and locking means for the scale beam operable by the rod on the rotation of the latter.

16. In a weighing scale, a frame, a shaft journaled in the frame, a lever disposed substantially parallel with the shaft, a weight for moving on the lever, a locking arm for engaging the lever, and a cam on the shaft for operating the locking arm.

In testimony whereof I have signed my name to this specification in the presence of two subscribing witnesses.

ALBERT HUELSMAN.

Witnesses:
E. F. TAMBKE,
D. FULLER.

Copies of this patent may be obtained for five cents each, by addressing the "Commissioner of Patents, Washington, D. C."